United States Patent Office 3,480,533
Patented Nov. 25, 1969

3,480,533
PREPARATION OF SUBSTITUTED AROMATIC
COMPOUNDS
James J. Louvar, Evanston, Ill., assignor to Universal Oil
Products Company, Des Plaines, Ill., a corporation of
Delaware
No Drawing. Filed July 24, 1967, Ser. No. 655,297
Int. Cl. C07b 29/04; C07c 3/50
U.S. Cl. 204—158                                    12 Claims

ABSTRACT OF THE DISCLOSURE

Substituted aromatic compounds are prepared by irradiating an aromatic compound and a free radical generating precursor with ultra-violet light in the presence of a catalyst comprising an organometallic coordinating complex.

This invention relates to a process for preparing substituted aromatic compounds and particularly to a process for preparing substituted aromatic compounds utilizing a free radical generating precursor as the agent for effecting the substitution. More specifically, the invention is concerned with the process for preparing substituted aromatic compounds utilizing certain catalytic compositions of matter while effecting the reaction in the presence of a light source in which the wave lengths of the light fall within the ultra-violet spectrum.

Substituted aromatic compounds which may be prepared according to the process of this invention will find a wide variety of uses in the chemical field. For example, hexylphenol may be utilized as an intermediate in the synthesis of other organic compounds and for the preparation of resinous condensation products. Likewise, sec-butylbenzene will find use as a medium-high boiling solvent for coating compositions, the isomeric tertbutylphenols will be used as chemical intermediates for synthetic resins, plasticizers, surface-active agents, perfumes, intermediates for antioxidants, pour-point depressors and emulsion breakers for petroleum oils, insecticides etc. Likewise, the long-chain alkyl benzenes such as decylbenzene, dodecylbenzene, tetradecylbenzene, hexadecylbenzene, etc. are useful as intermediates in the preparations of detergents and surface-active agents. These latter compounds are particularly important, especially when the alkyl radical is straight chain in nature, inasmuch as these compounds will form commercially attractive biodegradable detergents. This is of importance due to the fact that, with the increased use of detergents and surface-active agents which are non-biodegradable in nature a pollution problem involving the streams, rivers, and other water sources of large cities has increased during the past few years. Therefore, by preparing alkyl benzene compounds which may be sulfonated in a further step and thereafter further treated to prepare biodegradable detergent which possess straight chain alkyl substituents the aforementioned problem of pollution will be greatly alleviated.

It is therefore an object of this invention to provide a process for preparing substituted aromatic compounds.

A further object of this invention is to provide a process for preparing substituted aromatic compounds utilizing a certain composition of matter while effecting the reaction in the presence of a light source possessing a certain wave length.

In one aspect an embodiment of this invention resides in a process for the photo excited electrophylic substitution of an aromatic compound which comprises irradiating said aromatic compound and a free radical generating precursor with ultra-violet light in the presence of a catalyst comprising an organo-metallic coordination complex, and recovering the resultant product.

A specific embodiment of this invention is found in a process for the photo excited electrophylic substitution of an aromatic compound which comprises irradiating benzene and di-n-decyl peroxide with ultra-violet lights having a wave length of from about 1600 A. to about 3500 A. in the presence of a catalyst which comprises cupric acetonyl acetonate, and recovering the resultant n-decylbenzene.

Other objects and embodiments will be found in the following further detailed description of this invention.

As hereinbefore set forth, the present invention is concerned with a process for the photo excited electrophylic substitution of an aromatic compound, said process being effected by irradiating an aromatic compound and a free radical generating precursors with ultra-violet light in the presence of certain catalytic compositions of matter. Examples or aromatic compounds which may be utilized as starting material in the process of this invention are those which possess the generc formula:

in which X is selected from the group consisting of hydrogen, halogen, nitro, amino, hydroxyl, thiohydroxyl and alkoxy radicals. Specific examples of these aromatic compounds include benzene, chlorobenzene, bromobenzene, iodobenzene, fluorobenzene, nitrobenzene, aniline, N-methylaniline, N,N-dimethylaniline, N-ethylaniline, N,N-di-ethylaniline, phenol, thiophenol, anisole, phenetole, propylphenol ether, etc. It is to be understood that the aforementioned aromatic compounds are only representatives of the class of compounds which may undergo substitution according to the process described herein and that it is possible to utilize polycyclic aromatic compounds such as naphthalene, methylnaphthalene, hydroxynaphthalene, the corresponding anthracenes, phenantrene, chrysenes, etc. as starting materials, although not necessarily with equivalent results.

The aforementioned aromatic compounds undergo substitution utilizing free radical generating precursors as the substituting agents these precursors will generally possess the generic formula:

R—O—O—R or

R—N=N—R in which the R's are selected from the group consisting of alkyl radicals containing from 1 to about 20 carbon atoms, aromatic, cycloalkyl and heterocyclic radicals. Specific examples of these compounds include dimethyl peroxide, diethyl peroxide, di-n-propyl peroxide, diisopropyl peroxide, di-n-butyl peroxide, di-sec-butyl peroxide, di-tert-butyl peroxide, the isomeric hexyl peroxides, heptyl peroxides, octyl peroxides, nonyl peroxides, decyl peroxides, undecyl peroxides, dodecyl peroxides, tridecyl peroxides, tetradecyl peroxides, pentadecyl peroxides, hexadecyl peroxides, octadecyl peroxides, eicosyl peroxides, diphenyl peroxide, dibenzyl peroxide, di(o-tolyl) peroxide, di(p-tolyl) peroxide, dicyclopentyl peroxide, dicyclohexyl peroxide, difuryl peroxide, dithiofuryl peroxide, dipyryl peroxide, dipyridyl peroxide, etc.; azourethane, azoethane, azopropane, azoisopropane, azobutane, azosecbutane, azo-t-butane, azopentanes, azoheptanes, azooctanes, azononanes, azodecanes, azodendecanes, azotridecanes, azotetradecanes, azopentadecanes, azohexadecanes, azohextadecanes, azooctadecanes, azononadecanes, azoeicosanes, azobenzene, azophenylmethano, azotoluenes, azocuclopentane, azocyclohexane, azofurou, azothiofurou, azopyrrole, azopyridine, etc. It is to be understood that these free radical generating precursors are only representatives of the class of substituting agents which may be utilized, and that the present invention is not necessarily limited thereto.

The photo excited electrophylic substitution process is effected in the presence of certain catalytic compositions of matter which comprise organometallic coordination complexes which are soluable in organic solvents hereinafter set forth. The metallic portion of the catalyst complex will preferably comprise certain metals in their highest valence state. These metals will comprise soluble salts of the ferric, cupric, mercuric, nickelic and cobaltic ions. Specific examples of these organometallic coordination complexes include ferric acetate, cupric acetate, mercuric acetate, cobaltic acetate, nickelic acetate, ferric propionate, cupric propionate, mercuric propionate, cobaltic propionate, nickelic propionate, ferric butyrate, cupric butyrate, mercuric butyrate, cobaltic butyrate, ferric valerate, cupric valerate, cobaltic valerate, nickelic valerate, ferric caprocate etc., ferric acetonyl acetonate, cupric acetonyl acetonate, mercuric acetonyl acetonate, cobaltic acetonyl acetonate, ferric ethylenediamine tetraacetic acetate, cupric ethylenediamine tetraacetic acetate, nickelic ethylenediamine tetraacetic acetate, cobaltic ethylenediamine tetraacetic acetate, etc.

The aforementioned reaction is effected by irradiating a solution of the aromatic compound and the free radical generating precursors at a temperature in the range of from about 0° up to about 250° C. and at a pressure in the range of from about atmospheric to about 50 atmospheres or more, the amount of pressure utilized being that which is necessary to maintain a major proportion of the reactants in the liquid phase. The irradiation of the solution is accomplished by subjecting the solution to a light source having a wave length of from about 1600 A. to about 3500 A. which is in the ultra-violet spectrum. In addition, if so desired, a substantially inert organic solvent may be utilized in order that the reaction will proceed in the liquid phase. Preferred solvents which may be used include paraffinic hydrocarbons such as n-pentane, n-hexane, n-heptane, cyclopentane, methylcyclopentane, cyclohexane, etc.

The process of this invention may be effected in any suitable manner and may comprise either a batch type of continuous type operation for example, when a batch type operation is used a quantity of the aromatic compound and the free radical generating precursor in a mole ratio of from about 1:1 to about 2:1 moles of precursors per mole of aromatic compound are placed in an appropriate condensation apparatus along with a soluble organometallic complex catalyst of the type herein before set forth in greater detail and, if so desired, an inert organic solvent. This apparatus may comprise a quartz reactor or it may be made of synthetic material known in the trade as Vycor. The light solution is activated and allowed to irradiate the mixture, which may be continuously stirred during the irradiation, for a predetermined residence time which may range from about 0.5 up to about 10 hours or more in duration. The irradiation is preferably effected at ambient temperature and atmospheric pressure, although higher or lower temperatures and higher pressure may be utilized if so desired. At the end of the desired residence time the emission from the light source is discontinued and the reaction mixture recovered. The mixture is separated from the catalyst and solvent by conventional means and thereafter subjected to means such as fractional distillation, crystallization, etc. whereby the desired substituted aromatic compound is separated from any unreacted starting material and/or unwanted side reaction products which may have been formed during the reaction.

It is also contemplated within the scope of this invention that the photo excited electrophylic substitution of the aromatic compound may be effected in a continuous manner of operation. When such a type of operation is used, an appropriate condensation apparatus which comprises quartz or the synthetic material known as Vycor is subjected to the rays of a light source in which the wave length of the light is from about 1600 A. to about 3500 A., while being maintained at the proper operating conditions of temperature and pressure. The starting materials comprising the aromatic compound and the free radical generating precursor are continuously charged to the reactor by separate means. In addition, the organometallic coordination complex catalyst and the solvent are also continuously charged to the reactor through separate means or, alternatively the catalyst and solvent may be admixed prior to entry into said reactor and charged thereto in a single stream. Upon completion of the residence time the reactor effluent is continuously discharged from the reactor and subjected to separation means whereby the desired product comprising the substituted aromatic compound is removed and recovered while any unreacted starting material may be recycled to form a portion of the feed stock.

Examples of substituted aromatic compounds which may be prepared according to the process of this invention include toluene, ethylbenzene, n-propylbenzene, isopropylbenzene, (cumene), the isomeric butyl-, pentyl-, hexyl-, heptyl-, octyl-, nonyl-, decyl-, dodecyl benzenes, etc., biphenyl, cycohexylbenzene, butylchlorobenzene, hexylchlorobenzene, octylchlorobenzene, decylchlorobenzene, cyclohexylchlorobenzene, pentylbromobenzene, heptylbromobenzene, nonylbromobenzene, dodecylbromobenzene, butylnitrobenzene, hexylnitrobenzene, octylnitrobenzene, decylnitrobenzene, cyclohexylnitrobenzene, butylaniline, hexyaniline, octylaniline, decylaniline, cyclohexylaniline, pentylphenol, heptylphenol, nonylphenol, dodecylphenol, butylthiophenol, hexylthiophenol, octylthiophenol, decylthiophenol, cyclohexylthiophenol, etc. It is to be understood that the aforementioned compound are only representative of a class of substituted aromatic compound which may be prepared according to the process described herein and that the present invention is not necessarily limited thereto.

The following examples are given to illustrate the process of the present invention which, however, are not intended to limit the generally broad scope of the present invention in strict accordance therewith.

EXAMPLE I

In this example 1.0 mole of benzene and 1.0 mole of di-n-decyl peroxide are placed in a quartz reaction vessel along with a catalytic amount of ferric acetonyl acetate. In addition, a solvent comprising n-pentane is also placed in the reactor which is thereafter subjected to the emission of an ultra-violet lamp, the light source having a wave length of about 2537.

The mixture is subjected to this irradiation for a period of about 2 hours while constantly stirring the reaction mixture. At the end of this time the irradiation is discontinued and the reactor is opened. The reaction mixture is subjected to fractional distillation preferable under reduced pressure, whereby the desired product comprising n-decylbenzene is separated from the unreacted starting materials, the solvent and the catalyst, and recovered.

EXAMPLE II

In this example 1 mole of phenol and 1 mole of azocyclohexane are placed in a quartz reaction vessel along with a catalytic amount of cupric acetonyl acetate. The reactor is sealed and thereafter subjected to irradiation by means of an ultra-violet light source in which the light rays have a wave length of about 3500 A., said irradiation being effected for a period of about 4 hours. At the end of this time the irradiation is discontinued and the reaction mixture is subjected to fractional distillation of reduced pressure. The desired product comprising cyclohexylphenol is separated and recovered from the catalyst in the unreacted azocyclohexane and phenol.

EXAMPLE III

In this example a mixture of 1.0 mole of aniline and 1.0 mole of di-n-hexyl peroxide is placed in a quartz reactor along with a catalytic amount of cobaltic acetate and a solvent comprising n-hexane. The mixture is thereafter subjected to irradiation utilizing an ultra-violet light source which has a wave length of about 2537. A., said irradiation being effected for a period of about 4 hours. During this period of irradiation the reaction mixture is continuously agitated in order to assure a complete admixture of the contents of the reactor. At the end of the aforementioned residence time the irradiation is discontinued and the reaction mixture is recovered from the quartz reactor. The reaction mixture is then subjected to fractional distillation under reduced pressure after removal of the solvent by evaporation. The fractional distillation will permit separation and recovery of the desired product comprising n-hexylaniline from the unreacted aniline and di-n-hexyl peroxide, the latter two compounds being used as a portion of the starting materials.

EXAMPLE IV

In this example 0.1 mole of anisole and 1 mole of azobenzene are placed in an appropriate reactor made of a synthetic material known in the trade as Vycor, along with a catalytic amount of cobaltic butyrate. The mixture is then irradiated for a period of about 3 hours at ambient temperature and atmospheric pressure utilizing an ultra-violet light source in which the emission has a wave length of about 3500 A. At the end of the desired residence time the irradiation is discontinued and the reaction mixture is recovered. After subjecting the aforesaid mixture to fractional distillation under reduced pressure, the desired product comprising phenylanisole is separated and recovered.

I claim as my invention:

1. A process for the photo excited electrophylic substitution of an aromatic compound which comprises irradiating said aromatic compound and a free radical generating precursor as a substitution agent with ultra-violet light in the presence of a catalyst comprising an organometallic coordination complex, said precursor possessing the generic formula:

or

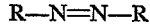

in which the R's are selected from the group consisting of alkyl radicals containing from 1 to 20 carbon atoms, aromatic, cycloalkyl and heterocyclic radicals, and recovering the resultant product.

2. The process as set forth in claim 1, further characterized in that said substitution is effected at a temperature in the range of from about 0° to about 250° C. and a pressure in the range of from about atmospheric to about 50 atmospheres.

3. The process as set forth in claim 1, further characterized in that said ultra-violet light has a wave length of from about 1600 A. to about 3500 A.

4. The process as set forth in claim 1, further characterized in that said catalyst comprises cupric acetonyl acetonate.

5. The process as set forth in claim 1, further characterized in that said catalyst comprises ferric acetonyl acetonate.

6. The process as set forth in claim 1, further characterized in that said aromatic compound comprises benzene.

7. The process as set forth in claim 6, further characterized in that said precursor comprises di-n-decyl peroxide and said product comprises n-decylbenzene.

8. The process as set forth in claim 1, further characterized in that said aromatic compound comprises phenol.

9. The process as set forth in claim 8, further characterized in that said precursor comprises azocyclohexane and said product comprises cyclohexylphenol.

10. The process as set forth in claim 1, further characterized in that said aromatic compound comprises aniline.

11. The process as set forth in claim 10, further characterized in that said precursor comprises di-n-hexyl peroxide and said product comprises n-hexylaniline.

12. The process as set forth in claim 1, further characterized in that said aromatic compound comprises nitrobenzene.

References Cited

UNITED STATES PATENTS 3,367,978 2/1968 White _____ 204—158
3,347,763 10/1967 Coffey et al. _____ 204—158

OTHER REFERENCES

Takezaki et al.: The Journal of Chemical Physics, vol. 25, No. 3 (September 1956), pp. 536–542.

H. S. WILLIAMS, Primary Examiner

U.S. Cl. X.R.

204—162